US010926883B2

(12) United States Patent
Kamenetz et al.

(10) Patent No.: US 10,926,883 B2
(45) Date of Patent: Feb. 23, 2021

(54) ENVIRONMENTAL CONTROL SYSTEM INCLUDING SHARED AIR SOURCE WITH BALANCED AIRFLOW OUTPUT

(71) Applicant: HAMILTON SUNDSTRAND CORPORATION, Charlotte, NC (US)

(72) Inventors: Jeffry K. Kamenetz, Windsor, CT (US); Erin G. Kline, Vernon, CT (US); Jeffrey Ernst, Wethersfield, CT (US); James Joyce, Bristol, CT (US); Kevin R. DeRoy, Vernon, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 281 days.

(21) Appl. No.: 15/927,568

(22) Filed: Mar. 21, 2018

(65) Prior Publication Data
US 2019/0291872 A1    Sep. 26, 2019

(51) Int. Cl.
F02C 6/08    (2006.01)
B64D 13/06    (2006.01)
G05D 7/06    (2006.01)

(52) U.S. Cl.
CPC .............. *B64D 13/06* (2013.01); *F02C 6/08* (2013.01); *G05D 7/0658* (2013.01); *B64D 2013/064* (2013.01); *B64D 2013/0618* (2013.01); *F05D 2220/323* (2013.01)

(58) Field of Classification Search
CPC ........... B64D 13/04; B64D 2013/0603; B64D 2013/0618; B64D 2013/064; F05D 2270/705
See application file for complete search history.

(56) References Cited

U.S. PATENT DOCUMENTS

| 5,155,991 | A | 10/1992 | Bruun | |
|---|---|---|---|---|
| 6,494,047 | B2 | 12/2002 | Yeung | |
| 6,782,701 | B2 | 8/2004 | Liu et al. | |
| 7,036,319 | B2 | 5/2006 | Saunders et al. | |
| 2006/0174628 | A1* | 8/2006 | Mikhail | B64D 13/00 60/772 |
| 2009/0193811 | A1* | 8/2009 | Monteiro | F02C 6/08 60/782 |

(Continued)

FOREIGN PATENT DOCUMENTS

| DE | 69201452 T2 | 6/1995 |
|---|---|---|
| EP | 0190943 A2 | 8/1986 |
| WO | 0248813 A2 | 6/2002 |

OTHER PUBLICATIONS

Search Report for European Application No. 19162932.8; Date of Filing Mar. 14, 2019; dated Jul. 5, 2019 (11 pages).

*Primary Examiner* — Craig Kim
*Assistant Examiner* — Alyson Joan Harrington
(74) *Attorney, Agent, or Firm* — Cantor Colburn LLP

(57) ABSTRACT

An aircraft includes a first engine that generates first bleed air flow and a second engine that generates second bleed air flow. The aircraft further includes an aircraft environmental control system (ECS) with a bleed manifold to collect the first bleed air flow and the second bleed air flow, and one or more air cycle machines to perform air conditioning consuming bleed air flow from the bleed manifold. The ECS balances the first bleed air flow and the second bleed air flow output from the first engine and second engine, respectively, based on a bleed manifold pressure of the bleed manifold.

19 Claims, 5 Drawing Sheets

(56) References Cited

U.S. PATENT DOCUMENTS

2009/0298407 A1   12/2009   Anderson et al.
2017/0137132 A1    5/2017   Wiegers et al.
2018/0057172 A1*  3/2018   Sautron ................. B64D 13/06
2018/0065752 A1    3/2018   Franco et al.

* cited by examiner

ENVIRONMENTAL CONTROL SYSTEM INCLUDING SHARED AIR SOURCE WITH BALANCED AIRFLOW OUTPUT

BACKGROUND

Exemplary embodiments pertain to the aircraft systems, and more specifically, to aircraft environmental control systems.

An aircraft environmental control system (ECS) typically employs one or more air cycle machines (ACMs) such as, for example, a pneumatic air cycle kit (PACK), which provides heated or cooled air conditioning to the passengers and flight crew. For example, bleed air generated by an aircraft engine can be input to the PACK, which in turn generates conditioned air, i.e., heated or cooled air flow. Certain scenarios may occur where two engines deliver the conditioned air to a common load or device (e.g., PACK). In these scenarios, the amount of air flow output by each engine not only affects the power of individual aircraft engine driving the PACK, but also the balance in power (e.g., thrust) between the different engines installed on the aircraft.

BRIEF DESCRIPTION

According to at least one non-limiting embodiment, an aircraft includes a first engine that generates first bleed air flow and a second engine that generates second bleed air flow. The aircraft further includes an aircraft environmental control system (ECS) with a bleed manifold to collect the first bleed air flow and the second bleed air flow, and one or more air cycle machines to perform air conditioning consuming bleed air flow from the bleed manifold. The ECS balances the first bleed air flow and the second bleed air flow output from the first engine and second engine, respectively, based on a bleed manifold pressure of the bleed manifold.

According to another non-limiting embodiment, an aircraft environmental control system (ECS) includes a bleed manifold to collect first bleed air flow supplied by a first aircraft engine, and to collect second bleed air flow supplied by a second aircraft engine. One or more air cycle machines are configured to perform air conditioning on the first bleed air flow delivered from the first and second air flow delivered from the second delivered from the bleed manifold. The ECS further includes an electronic hardware controller that controls the ECS to balance the first bleed air flow and the second bleed air flow output from the first engine and second engine, respectively, based on a bleed manifold pressure of the bleed manifold.

According to yet another non-limiting embodiment, a method is provided to balance bleed air flow generated by a plurality of engines installed on an aircraft. The method comprises generating first bleed air flow via a first engine, and generating second bleed air flow via a second engine. The method further includes collecting, via a bleed manifold, the first bleed air flow and the second bleed air flow. The method further includes performing, via at least one air cycle machine, air conditioning consuming bleed air flow from the bleed manifold. The method further includes determining a bleed manifold pressure of the bleed manifold. The method further includes balancing the first bleed air flow and the second bleed air flow output from the first engine and second engine, respectively, based on the bleed manifold pressure of the bleed manifold.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

In scenarios where two engines provide air to a common load or device, equal flow from each engine can be achieved without controlling the output air flow from each individual engine. Equal air flow permits the input power from an individual engine to remain the same. In this manner, each engine can realize an equal amount of wear with respect to one another. In other words, a given engine is not required to supply the entire air flow to a common load or device, thereby preventing a given engine from wearing out quicker than the remaining engines.

In addition, due to a failure of one of two packs or due to the pilot turning off one pack for fuel economy when the aircraft has a reduced passenger count, if a given PACK uses bleed-air from two sources, it is desirable to have each engine supply an equal amount of flow such that both engines operate at roughly equal power and hence thrust. For example, the power of individual aircraft engines can vary in order to provide bleed air used by a given PACK. In the case of a twin engine platform, for example, the left and right engine throttles, which control the left and right engines, respectively, are mounted adjacent to each other such that the pilot can move them as a pair and at the same throttle position to maintain straight flight. Asymmetrical thrust, however, causes the aircraft to veer in one direction or requires the pilot to perform more flight control adjustments to trim the aircraft. Therefore, if one engine supplies the majority of the bleed air to a common load or device, it would be necessary to stagger or offset the left and right throttles to compensate for the power imbalance between the left and right engines, thereby causing increased workload for the flight crew.

Figure 1:
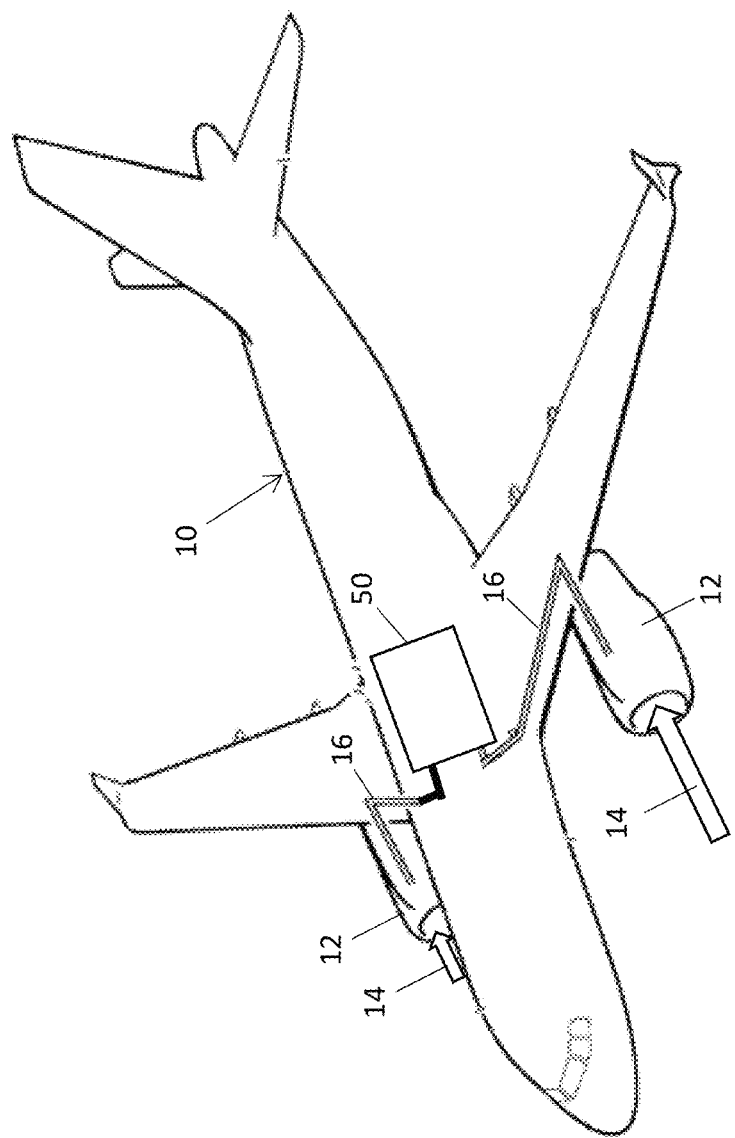
FIG. 1 is diagram of an aircraft including an environmental control system (ECS) according to a non-limiting embodiment.

Conventional ECSs implement several temperature sensors and pressure sensors to measure the air flow (e.g., the mass air flow) associated with the PACKs. Adding mass flow sensors to the bleed air flows, however, increase the cost of the ECS while also introducing unreliability that requires additional diagnostic procedures. In the alternative, mass flow sensors could be removed from the PACKs and located in the bleed air flow, but the bleed air environment is harsh in terms of dirt, temperature and vibration and would also introduce additional unreliability in the ECS. Accordingly, one or more non-limiting embodiments described herein provide an ECS capable of maintaining the air flow from each engine at relatively the same air flow rate with respect to one another, without implementing additional temperature sensors, pressure sensors and/or mass air flow sensors to perform air flow measurements With reference now to FIG. 1, an aircraft 10 including an environmental control system (ECS) 50 is illustrated according to a non-limiting embodiment. The aircraft 10 includes one or more engines 12. The engines 12 intake air 14, which is compressed in a compressor (not shown). The compressed air is mixed with a fuel burning system (not shown) to generate thrust.

A portion of the intake air, typically referred to as bleed air, is diverted to the ECS 50 via one or more bleed air paths 16. In general, the ECS 50 aims to perform air conditioning (heated output air and/or cooled output air to the flight deck, cabin, cargo compartments, and avionics bay, etc.), while also assisting in flight deck and cabin pressurization. The ECS 50 includes a bleed air system (not shown in FIG. 1), which utilizes the bleed air (e.g., high-pressure bleed air and low-pressure bleed air) to control temperatures of various areas of the aircraft 10 such as the cabin and/or flight decks, etc.

Figure 2A:
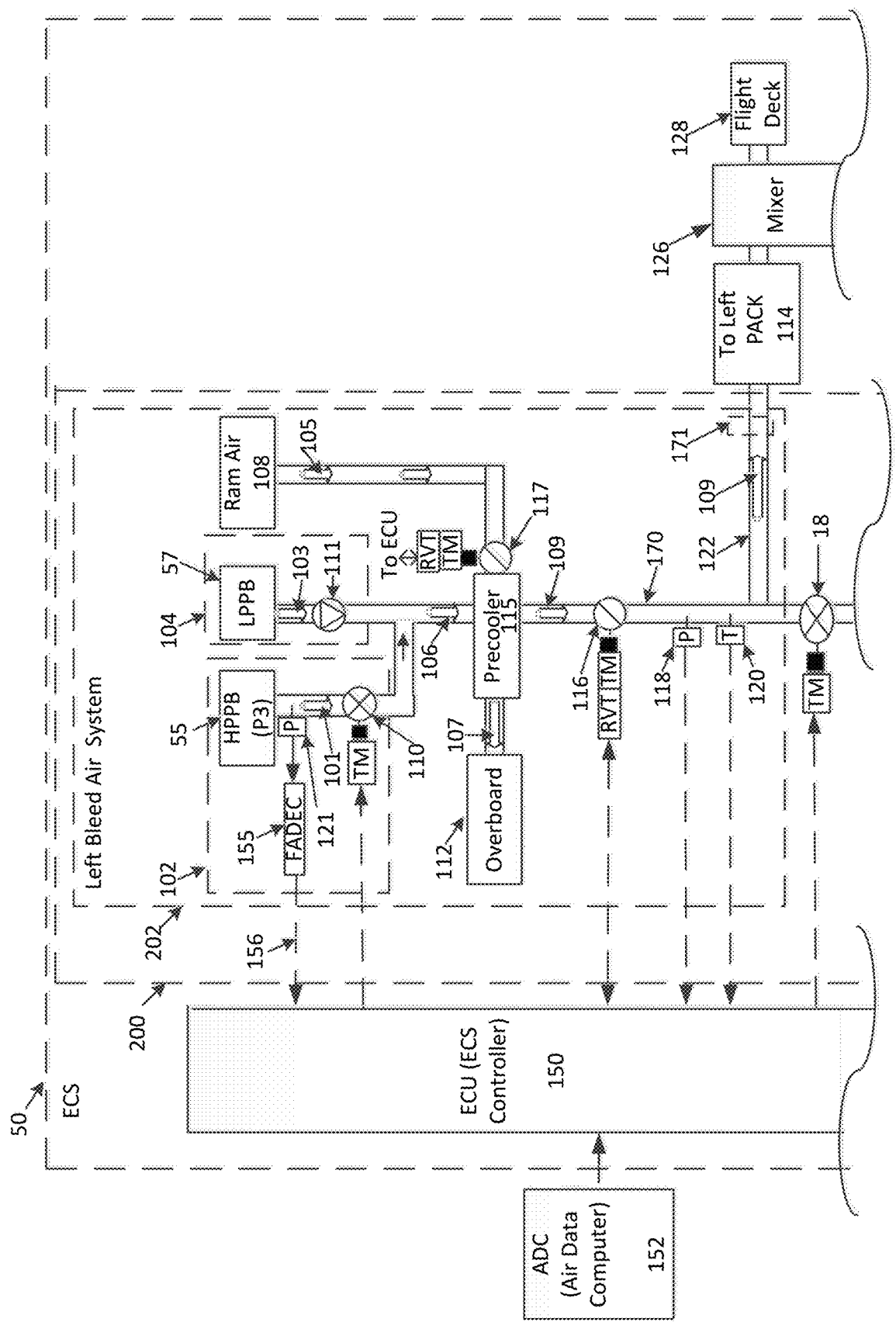
FIGS. 2A-2B is a diagram of left and right portions of a bleed air system included in an aircraft ECS according to a non-limiting embodiment.
Figure 2B:
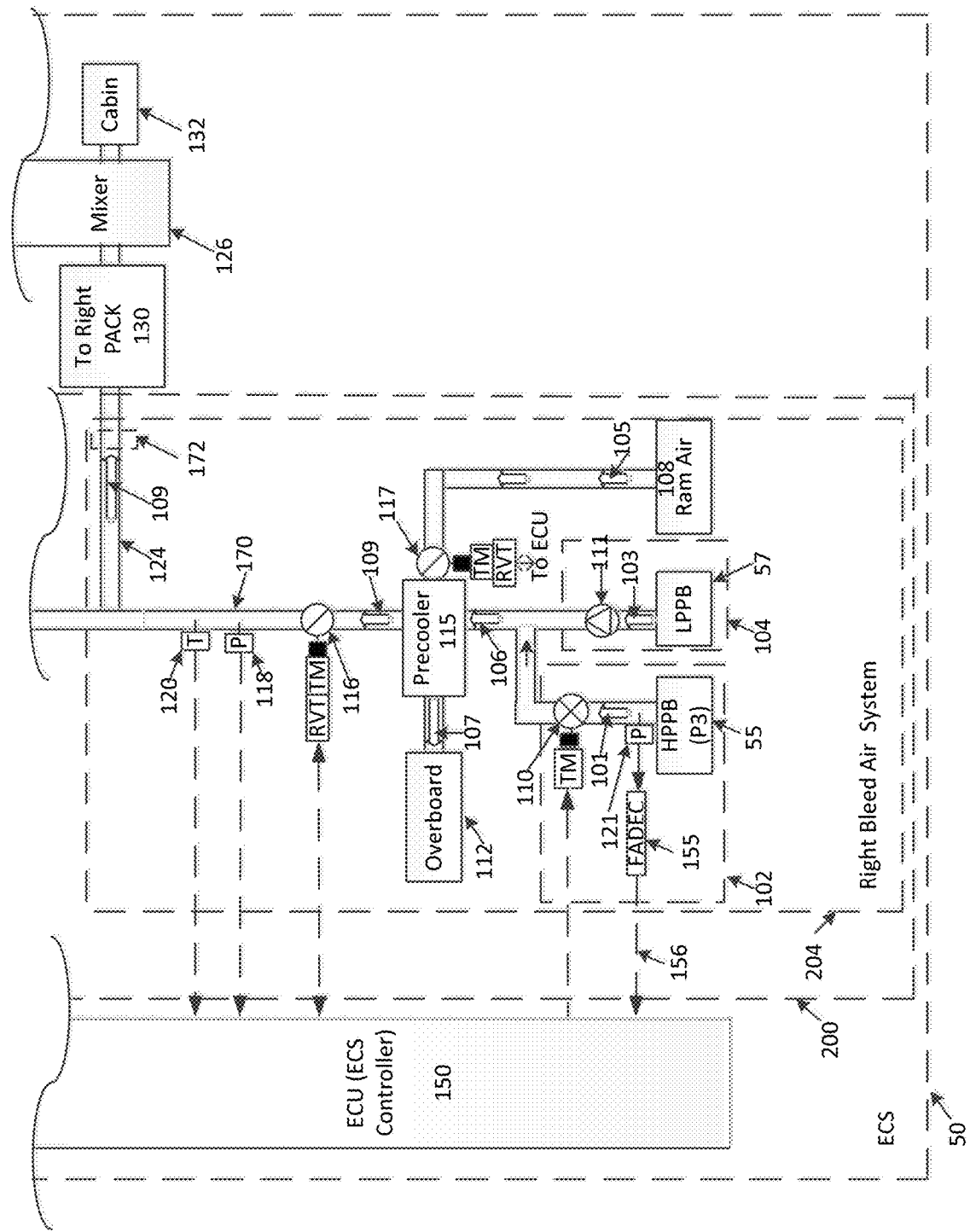

Turning now to FIGS. 2A-2B, a bleed air system 200 included in the ECS 50 is illustrated according to a non-limiting embodiment. The bleed air system 200 includes a left bleed air portion 202 which can receive bleed air from a left engine 12 and a right bleed air portion 204 which can receive bleed air from a right engine 12. The left and right bleed air portions 202 and 204 are controlled by an electronic ECS controller 150 in signal communication with an electronic air data computer (ADC) 152. The ADC 152 can operate to determine (e.g., calculate) ambient pressure (Pamb) and/or ambient temperature (Tamb) values. In at least one embodiment, the controller 150 (hereinafter referred to as the ECS controller 150) controls both bleed air portions 202 and 204.

The bleed manifold 170 is has outlets 122, 124 which flow into the left bleed air portion 202 and right bleed air portion 204 respectively. The outlets 122, 124 of the bleed manifold 170 lead to the inlets 171, 172 of left PACK 114 and of right PACK 130 respectively. The bleed manifold 170 can also include a cross-bleed valve 18, which controls the supply of pre-cooled source air 109 (output from pre-coolers 109) to the left and right PACKs 114 and 130. The cross-bleed valve can be adjusted at any time (e.g., by a control signal) to control the pre-cooled source air 109 delivered to the left PACK 114 and the right PACK 130 via manifold outlets 122 and 124 respectively. In this manner, the bleed air system 200 can operate according to different modes as described in greater detail below.

The left and right PACKs 114 and 130 are installed as separate and individual components. Each PACK 114 and 130 utilizes an air cycle machine which converts the pre-cooled air 109 into temperature-regulated air (heated air or cooled air). The PACKS 114 and 130 are also capable of measuring and controlling the mass flow of air using integrated mass air flow (MAF) sensors (not shown). Air output from the left and right PACKS 114 and 130, respectively, is delivered to a mixing and distribution unit 126 which can operate to mix air output from the PACKs 114 and 130, and with recirculated air from the cabin and flight deck. The mixed air can also be delivered to different zones of the aircraft 10, i.e., the flight deck 128 and the cabin 132.

The remaining components of the left bleed air portion 202 and right bleed air portion 204 are mirror images of one another. For the sake of brevity, the bleed air system 200 will be described in terms of the left bleed air portion 202 with the understanding the descriptions of the left air portion 202 can be applied to the right bleed air portion 204.

Based on the position of the cross-bleed valve 18 under control by the ECS controller 150, the bleed air system 200 can operate in a 2S2P (two sources and two PACKs) mode, 1S2P (one source and two PACKs), 1S1P (one source and one PACK), or a 2S1P (two sources and one PACK). When operating in the 2S2P mode, the cross bleed valve remains closed and the left air outlet 122 supplies pre-cooled air 109 to the left PACK 114, while the right air outlet 124 supplies pre-cooled air 109 to the right PACK 130. When operating in the 1S2P mode (e.g., during an ECS fault event), the cross bleed valve is opened and pre-cooled air 109 from either the left precooler 115 or the right precooler 115 is delivered to both left PACK 114 and the right PACK 130 via the bleed manifold 170. When operating in the 2S1P mode, the cross bleed valve is opened and pre-cooled air 109 from both the left precooler 115 and the right precooler 115 is delivered to either the left PACK 114 or the right PACK 130. The 2S1P mode may be invoked, for example, when one PACK has failed leaving a remaining pack to provide all the heating and cooling needs of the flight deck and cabin. The 2S1P mode can also be invoked when the aircraft is operating on the ground or with reduced passenger load and one PACK is turned off to improve fuel economy.

The pre-cooler 115 operates according to either heated high-pressure bleed air 101 or low-pressure bleed air 103. For instance, a high-pressure bleed air network 102 ducting receives the high-pressure bleed air 101 from a high-pressure port bleed source (HPPB) 55, and a low-pressure bleed air network 104 ducting receives the low-pressure bleed air 103 from a low pressure port bleed source (LPPB) 57. An output duct 106 commonly connects the output of the high-pressure bleed air network 102 ducting and the output of the low-pressure bleed air network 104 ducting.

The high-pressure bleed air network 102 further includes a high-pressure bleed air shutoff valve 110. The high-pressure bleed air shutoff valve 110 selectively controls the output of the high-pressure bleed air network 102 ducting and the output of the low-pressure bleed air network 104 ducting. When the aircraft 10 is operating at low-engine power, the high-pressure bleed air shutoff valve 110 can be opened such that the high-pressure bleed air 101 is delivered through the airflow networks in 202 and 204. Once the high-pressure bleed air shutoff valve 110 is opened, a check valve 111 installed in the low-pressure bleed air network 104 ducting is forced closed, thereby blocking the low-pressure bleed air 103 from flowing through the airflow networks in 202 and 204. When, however, the aircraft 10 is operating at high-power conditions, the high-pressure bleed air shutoff valve 110 can be closed which in turn opens the check valve 111 to supply low-pressure bleed air 103. Accordingly, the low-pressure bleed air 103 flows through the airflow networks in 202 and 204.

The airflow system 202 and 204 also includes a ram air system 108. The ram air system 108 generates cool air 105 (also known as a cold sink system) which can be used to cool the bleed air 101 or 103 delivered to the precooler 115. Heat from the high-pressure bleed air 101 or low-pressure bleed air 103 is then exchanged with the cool air 105. During the cooling process, cool air 105 is converted into heated ram air 107. This heated ram air 107 is discharged into the atmosphere via an overboard port 112 so that it is prevented from entering the cabin. In at least one embodiment, the ram air 105, 107 does not physically mix with the bleed air 106, 109; rather heat is exchanged only.

The pre-cooled air output 109 from the precooler 115 can be regulated using a pressure regulating shutoff valve (PRSOV) 116, while the PACKS 114 and 130 are capable of measuring and controlling the mass flow of air. Accordingly, the mass flow rate of either the high-pressure bleed air 101 or the low-pressure bleed air 103 can be determined. The pressure measurements from sensors 118 allow the ECS controller 150 to regulate the bleed manifold pressure using the PRSOV 116, while using the ram air control valve 117 to regulate the bleed manifold temperature. It should be appreciated that the bleed manifold pressure sensor 118 and/or bleed manifold temperature sensor 120 can be located at different locations than illustrated in FIGS. 2A-2B without departing from the scope of the invention.

When acting in the 2S1P mode, the position of the PRSOV 116 (i.e., slave PRSOV 116) associated with the deactivated PACK can be adjusted to match the position of the PRSOV 116 (i.e., master PRSOV 116) associated with the activated PACK. In other words, the slave PRSOV 116 would have a "slaving" response and would track the position of the master PRSOV 116.

In any of the operating modes provided by the bleed air system 200, the ECS controller 150 can generate a control signal that adjusts a position of the high-pressure bleed air shutoff valve 110, thereby selectively controlling delivery of the high-pressure bleed air 101 and low-pressure bleed air 103 to PACKs 114 and 130. As described above, when the high-pressure bleed air shutoff valve 110 is closed, the check valve 111 is automatically opened. Accordingly, high-pressure bleed air 101 is blocked from entering the output duct 106 while the low-pressure bleed air 103 is delivered to the output duct 106 and is ultimately used to provide bleed air to PACK 114. When the high-pressure bleed air valve 110 is opened, the check valve 111 is automatically closed. Accordingly, the low-pressure bleed air 103 is blocked from entering the output duct 106 while the high-pressure bleed air 101 is delivered to the output duct 106 and is ultimately used to provide bleed air to the PACK 114. In this manner, the ECS controller 150 can detect conditions which allow usage of the low-pressure bleed air 103, and can adjust the valve 110 such that the low-pressure bleed air 103 is delivered from the output duct 106 to provide bleed air to the PACK 114.

Furthermore, the ECS Controllers 150 command both left and right HPSOV 110 to the same position. If both left and right side do not need high pressure air, the HPSOVs 110 are both commanded to the closed position. If either the left side or right side do need high pressure air, the HPSOVs 110 are both commanded to the open position. When transitioning from HPSOVs ON to OFF or OFF to ON, it is important to close the cross-bleed valve 18 to prevent re-ingestion of hot cases from one engine to the other.

The 2S1P flow sharing mode is active only if the PLA settings for left and right engine are relatively equal as read by left and right FADECs 155. The PLA readings 156 are transmitted from the FADECs to the ECS Controller 150 via a digital serial link such as ARINC-429. If the PLA readings 156 are not equal, the 2S1P mode is disabled and the cross-bleed valve 18 is closed resulting in 1S1P mode. Should the PLA readings 156 become equal again, the ECS controller will enable 2S1P mode and open the cross-bleed valve 18.

The bleed air system 200 can utilize the operation of the PRSOV 116 to balance the flow extraction between the left engine 12 and the right engine 12 without using additional air flow measurements and/or sensors. That is, the bleed air system allows the air flow rates from each engine 12 to remain relatively the same (e.g., 50+/−20% of the total flow) with respect to one another without measuring the output air flow from each engine 12. The flow difference between engines is due to numerous small tolerance variations which are not corrected for such as engine pressures for a given PLA position, slight PLA throttle stagger, tolerances in reading PLA by the FADEC 155, asymmetric ducting to the pack, etc. In this manner, a less expensive system and a more reliable ECS 50 is provided.

Figure 3:
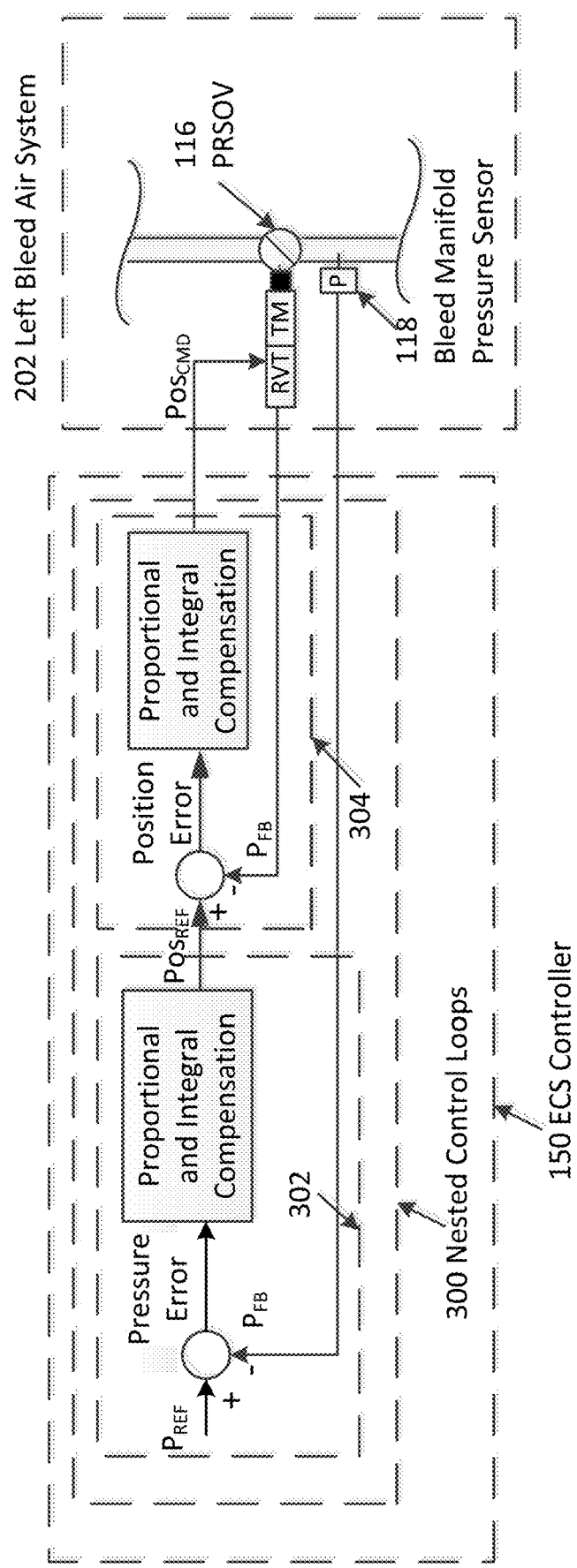
FIG. 3 is a block diagram illustrating a nested feedback control loop executed by an aircraft ECS to control a position of a valve according to a non-limiting embodiment.

As illustrated in FIG. 3, the PRSOV 116 can regulate bleed manifold pressure to a fixed constant value such (e.g., as 35 PSIG), while the inlet pressure to PRSOV 116 is greater than the fixed pressure value. The fixed pressure value can therefore be used as target or reference pressure value ($P_{Ref}$). In at least one embodiment, the PRSOV 116 outlet pressure is approximately 35 PSIG, regardless of whether high-pressure bleed air 101 or low-pressure bleed air 103 is used. A valve position sensor such as a rotary variable transformer (RVT) 125, for example, is also provided, which can measure the current position of the PRSOV 116. In this manner, the ECS controller 150 can execute a nested feedback control loop 300 to modulate (i.e., adjust) bleed manifold pressure using the PRSOV 116. For example, an outer loop 302 provides a subtracted measured feedback of the pressure $P_{FB}$ using sensor 118 from the reference pressure $P_{Ref}$ and then subjects the error to a proportional and integral compensation. The output of the outer loop 302 is then a PRSOV position reference $Pos_{Ref}$. This PRSOV position command $Pos_{Ref}$ becomes the reference or target value for an inner loop 304 on position. The inner loop 304 subtracts measured feedback of the position $Pos_{FB}$ of the PRSOV 116 from the reference $Pos_{Ref}$ and then subjects the error to a proportional and integral compensation. The output of the inner loop 304 is then a PRSOV position command $Pos_{Cmd}$. Accordingly, the ECS controller 150 can continuously adjust the PRSOV 116 until the value of the feedback pressure signal ($P_{FB}$) output by pressure sensor 118 reaches the reference pressure value ($P_{Ref}$); e.g., 35 PSIG).

Figure 4:
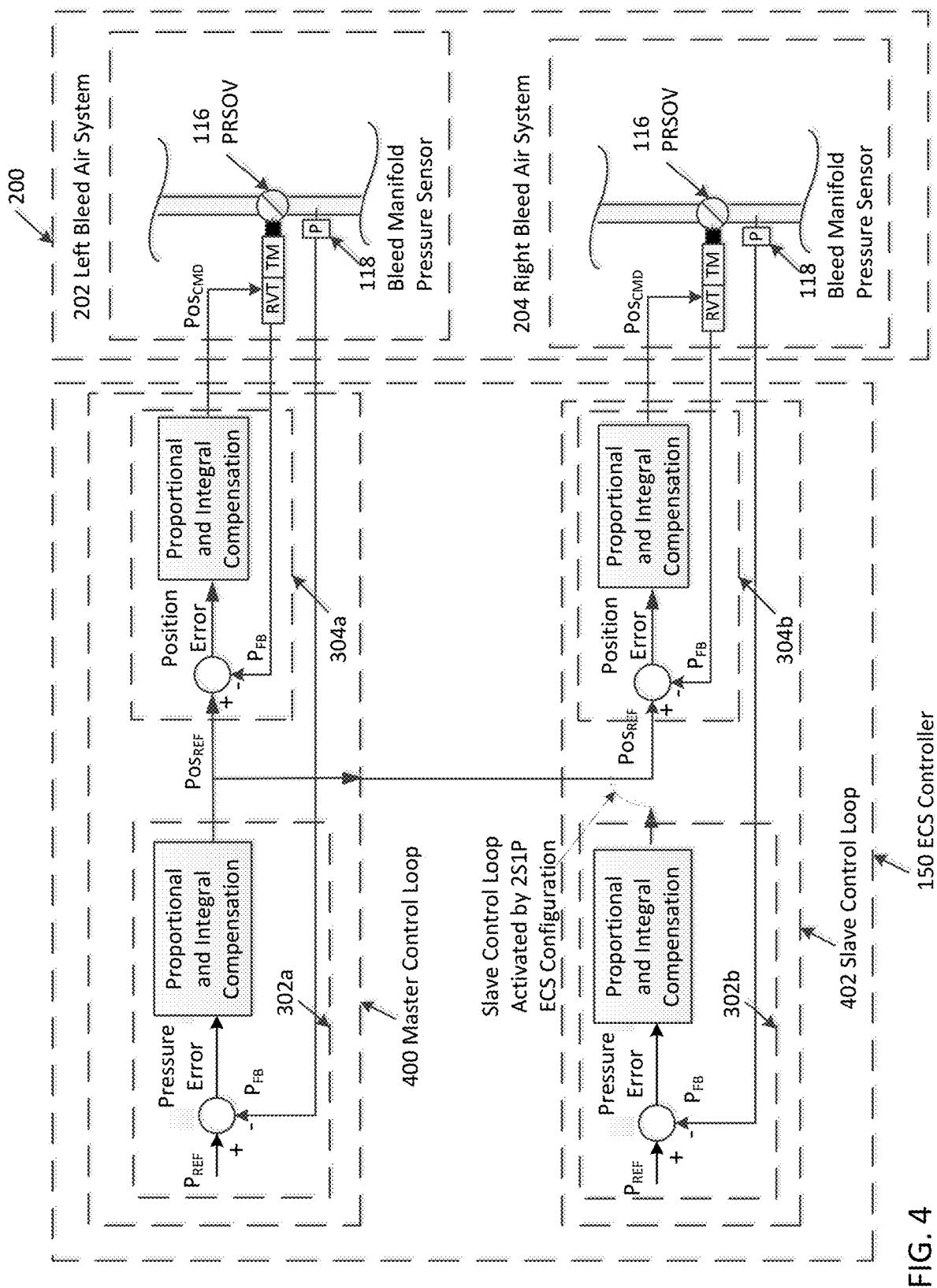
FIG. 4 is a block diagram illustrating positional control of a valve based on a nested feedback control loop that controls a position of a master valve according to another non-limiting embodiment.

Turning to FIG. 4, the bleed air system 200 is illustrated operating in the 2S1P mode. Assuming, for example, that the left PACK (not shown in FIG. 4) is activated while the right PACK (not shown in FIG. 4) is deactivated, the left PRSOV 116 would be modulated according to a master control loop 400 such that the bleed manifold pressure measured by left pressure sensor 118 is equal to $P_{Ref}$ (e.g., 35 PSIG), while the right PRSOV 116 acts as a slave (i.e., follows) to the left PRSOV 116. Because the right PRSOV 116 is acting as a slave to the left PRSOV 116 (i.e., is following the left PRSOV 116), the right PRSOV 116 is also adjusted based on the results of an inner loop 304b portion of nested slave control loop 402 to match the position of the left PRSOV 116. Specifically, $Pos_{Ref}$ from the left PRSOV Master Control Loop 400 is used to $Pos_{Ref}$ for the right PRSOV inner loop 304b.

Conversely, assuming, for example, that the right PACK (not shown in FIG. 4) is activated while the left PACK (not shown in FIG. 4) is deactivated, the right PRSOV 116 would be modulated according to a master control loop 400 such that the bleed manifold pressure measured by right pressure sensor 118 is equal to $P_{Ref}$ (e.g., 35 PSIG), while the left PRSOV 116 acts as a slave (i.e., follows) to the right PRSOV 116. Because the left PRSOV 116 is acting as a slave to the right PRSOV 116 (i.e., is following the right PRSOV 116), the left PRSOV 116 is also adjusted based on the results of a nested slave control loop 402 to match the position of the right PRSOV 116. In at least one embodiment, the proportional and integral gains for the pressure outer loop (302a/

302b) are half the values of those used when the PRSOV operates normally (i.e., not in master/slave mode).

As described above, various non-limiting embodiments provide an ECS that includes a nested feedback control loop that controls operation of the PRSOV 116 based on a comparison between the value of the feedback pressure signal ($P_{FB}$) output by pressure sensor 118 and a set target bleed manifold pressure value $P_{Ref}$ (e.g., 35 PSIG). In this manner, the flow extraction from multiple engines can be balanced using pressure sensors/measurements without requiring additional measurements and sensors to measure engine air flow.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft comprising:
   a first engine that generates first bleed air flow and a second engine that generates second bleed air flow; and
   an aircraft environmental control system (ECS) comprising:
   a bleed manifold to collect the first bleed air flow and the second bleed air flow; and
   at least one air cycle machine configured to perform air conditioning consuming output bleed air flow from the bleed manifold;
   a first precooler interposed between the first engine and the bleed manifold to deliver the first bleed air flow into the bleed manifold;
   a second precooler interposed between the second engine and the bleed manifold to deliver the second bleed air flow into the bleed manifold;
   a first pressure regulating valve interposed between the first engine and the bleed manifold, the first pressure regulating valve being downstream of the first precooler;
   at least one pressure sensor disposed downstream from both the first and second precoolers and mounted on the bleed manifold, the at least one pressure sensor configured to output a bleed manifold pressure signal indicating a bleed manifold pressure;
   a second pressure regulating valve interposed between the second engine and the bleed manifold, the second pressure regulating valve being downstream of the first precooler; and
   wherein at least one electronic hardware controller included in the ECS is configured to balance the first bleed air flow and the second bleed air flow output from the first engine and second engine, respectively, based on the bleed manifold pressure of the bleed manifold and a position of at least one of the first and second pressure regulating valves.

2. The aircraft of claim 1, wherein the ECS balances the first bleed air flow in relation to the second bleed air flow without measuring the first and second bleed air flows as output from the first engine and second engine, respectively.

3. The aircraft of claim 1, wherein the at least one electronic hardware controller adjusts the first pressure regulating valve based on a comparison between the bleed manifold pressure signal and a target bleed manifold pressure value assigned to the bleed manifold, and wherein the at least one electronic hardware controller adjusts the second pressure regulating valve based on a first reference position of the first pressure regulating valve.

4. The aircraft of claim 3, wherein:
   the at least one electronic hardware controller determines the first reference position of the first pressure regulating valve based on a difference between the bleed manifold pressure and the target bleed manifold pressure value, and adjusts the first pressure regulating valve based on a first position difference between the first reference position and an actual position of the first pressure regulating valve; and
   the at least one electronic hardware controller determines a second reference position of the second pressure regulating valve based on the first reference position of the first pressure regulating valve, and adjusts the second pressure regulating valve based on a second position difference between the second reference position and an actual position of the second pressure regulating valve.

5. The aircraft of claim 1, wherein the at least one electronic hardware controller adjusts both the first pressure regulating valve and the second pressure regulating valve based on a comparison between the bleed manifold pressure signal and a target bleed manifold pressure value assigned to the bleed manifold.

6. The aircraft of claim 5, wherein:
   the at least one electronic hardware controller determines a first reference position of the first pressure regulating valve based on a difference between the bleed manifold pressure and the target bleed manifold pressure value, and adjusts the first pressure regulating valve based on a first position difference between the first reference position and an actual position of the first pressure regulating valve; and
   the at least one electronic hardware controller adjusts a second position of the second pressure regulating valve to match the first reference position of the first pressure regulating valve.

7. An aircraft environmental control system (ECS) comprising:
   a bleed manifold to collect first bleed air flow supplied by a first aircraft engine, and to collect second bleed air flow supplied by a second aircraft engine;
   at least one air cycle machine configured to perform air conditioning on output bleed air flow delivered from the bleed manifold;

a first precooler interposed between the first engine and the bleed manifold to deliver the first bleed air flow into the bleed manifold;
a second precooler interposed between the second engine and the bleed manifold to deliver the second bleed air flow into the bleed manifold;
a first pressure regulating valve interposed between the first engine and the bleed manifold, the first pressure regulating valve being downstream of the first precooler;
at least one pressure sensor disposed downstream from both the first and second precoolers and mounted on the bleed manifold, the at least one pressure sensor configured to output a bleed manifold pressure signal indicating a bleed manifold pressure;
a second pressure regulating valve interposed between the second engine and the bleed manifold, the second pressure regulating valve being downstream of the first precooler; and
at least one electronic hardware controller configured to balance the first bleed air flow and the second bleed air flow output from the first engine and second engine, respectively, based on the bleed manifold pressure of the bleed manifold and a position of at least one of the first and second pressure regulating valves.

8. The ECS of claim 7, wherein the ECS balances the first bleed air flow in relation to the second bleed air flow without measuring the first and second bleed air flows as output from the first engine and second engine, respectively.

9. The ECS of claim 7, wherein the at least one electronic hardware controller adjusts the first pressure regulating valve based on a comparison between the bleed manifold pressure signal and a target bleed manifold pressure value assigned to the bleed manifold, and wherein the at least one electronic hardware controller adjusts the second pressure regulating valve based on a first reference position of the first pressure regulating valve.

10. The ECS of claim 9, wherein:
the at least one electronic hardware controller determines the first reference position of the first pressure regulating valve based on a difference between the bleed manifold pressure and the target bleed manifold pressure value, and adjusts the first pressure regulating valve based on a first position difference between the first reference position and an actual position of the first pressure regulating valve; and
the at least one electronic hardware controller adjusts a second position of the second pressure regulating valve to match the first reference position of the first pressure regulating valve.

11. The ECS of claim 7, wherein the at least one electronic hardware controller adjusts both the first pressure regulating valve and the second pressure regulating valve based on a comparison between the bleed manifold pressure signal and a target bleed manifold pressure value assigned to the bleed manifold.

12. The ECS of claim 11, wherein:
the at least one electronic hardware controller determines a first reference position of the first pressure regulating valve based on a difference between the bleed manifold pressure and the target bleed manifold pressure value, and adjusts the first pressure regulating valve based on a first position difference between the first reference position and an actual position of the first pressure regulating valve; and the at least one electronic hardware controller adjusts a second position of the second pressure regulating valve to match the actual position of the first pressure regulating valve.

13. A method of balancing bleed air flow generated by a plurality of engines installed on an aircraft, the method comprising:
generating first bleed air flow via a first engine, and generating second bleed air flow via a second engine;
collecting, via a bleed manifold, the first bleed air flow and the second bleed air flow;
delivering the first bleed air flow into the bleed manifold using a first precooler interposed between the first engine and the bleed manifold;
delivering the second bleed air flow into the bleed manifold using a second precooler interposed between the second engine and the bleed manifold;
regulating pressure between the first engine and the bleed manifold using a first pressure regulating valve interposed between the first engine and the bleed manifold, the first pressure regulating valve being downstream of the first precooler;
regulating pressure between the second engine and the bleed manifold using a second pressure regulating valve interposed between the second engine and the bleed manifold, the second pressure regulating valve being downstream of the second precooler;
determining a bleed manifold pressure of the bleed manifold using at least one pressure sensor disposed downstream from both the first and second precoolers and mounted on the bleed manifold, the at least one pressure sensor configured to output a bleed manifold pressure signal indicating the bleed manifold pressure;
configuring at least one electronic hardware controller to balance the first bleed air flow and the second bleed air flow output from the first engine and second engine, respectively, based on the bleed manifold pressure of the bleed manifold and a position of at least one of the first and second pressure regulating valves; and
performing, via at least one air cycle machine, air conditioning consuming output bleed air flow from the bleed manifold.

14. The method of claim 13, further comprising balancing the first bleed air flow in relation to the second bleed air flow without measuring the first and second bleed air flows as output from the first engine and second engine, respectively.

15. The method of claim 14, further comprising:
adjusting, via the at least one electronic hardware controller, a first position of the first pressure regulating valve based on a comparison between the bleed manifold pressure signal and a target bleed manifold pressure value assigned to the bleed manifold; and
adjusting, via the at least one electronic hardware controller, a second position of the second pressure regulating valve based on a first reference position of the first pressure regulating valve.

16. The method of claim 15, further comprising:
determining, via the at least one electronic hardware controller, the first reference position of the first pressure regulating valve based on a difference between the bleed manifold pressure and the target bleed manifold pressure value;
adjusting, via the at least one electronic hardware controller, the first position of the first pressure regulating valve;
determining, via the at least one electronic hardware controller, a second reference position of the second pressure regulating valve based on the first reference position of the first pressure regulating valve; and adjusting, via the at least one electronic hardware controller, the second position of the second pressure regulating valve based on a second position difference between the second reference position and an actual position of the second pressure regulating valve.

17. The method of claim 14, wherein:

determining, via the at least one electronic hardware controller, a first reference position of the first pressure regulating valve based on a difference between the bleed manifold pressure and a target bleed manifold pressure value;

adjusting, via the at least one electronic hardware controller, a first position of the first pressure regulating valve based on a first position difference between the first reference position and an actual position of the first pressure regulating valve; and adjusting, via the at least one electronic hardware controller, a second position of the second pressure regulating valve to match the first reference position of the first pressure regulating valve.

18. The aircraft of claim 1, wherein the at least one electronic hardware controller controls the first and second pressure regulating valves independently from one another in response to invoking a first air cycle machine operating mode of the ECS and controls the first pressure regulating valve dependent on the second pressure regulating valve in response to invoking a second air cycle machine operating mode of the ECS different from the first air cycle machine operating mode.

19. The ECS of claim 7, wherein the at least one electronic hardware controller controls the first and second pressure regulating valves independently from one another in response to invoking a first air cycle machine operating mode of the ECS and controls the first pressure regulating valve dependent on the second pressure regulating valve in response to invoking a second air cycle machine operating mode of the ECS different from the first air cycle machine operating mode.

* * * * *